D. P. MOORE.
PORTABLE HAND OPERATED SUCTION CLEANER.
APPLICATION FILED OCT. 11, 1909.
963,008.
Patented June 28, 1910.
4 SHEETS—SHEET 1.
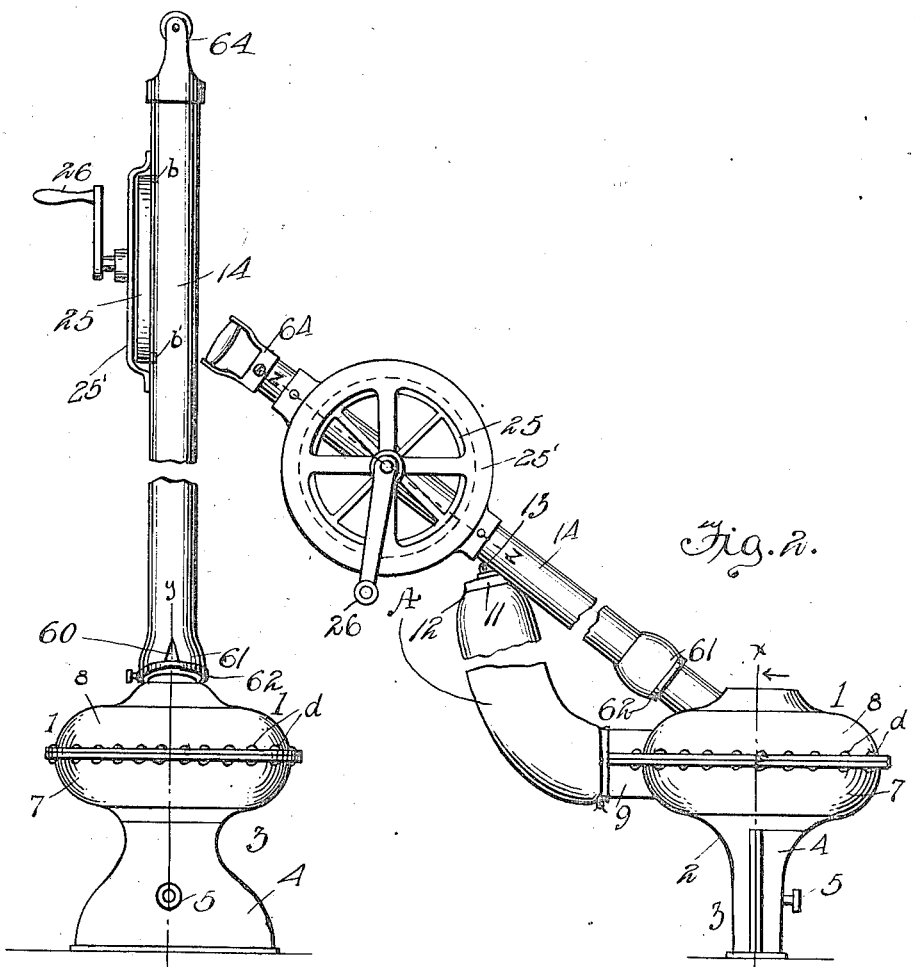

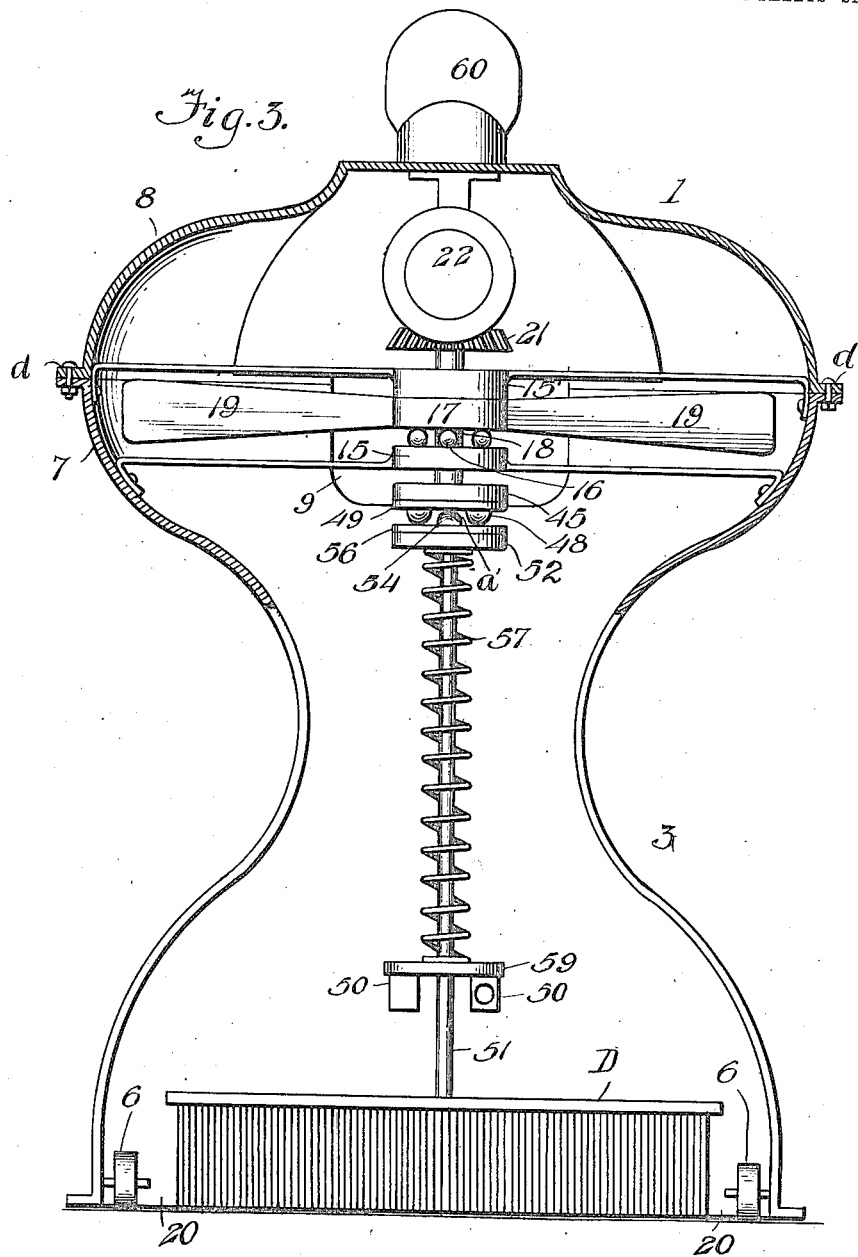

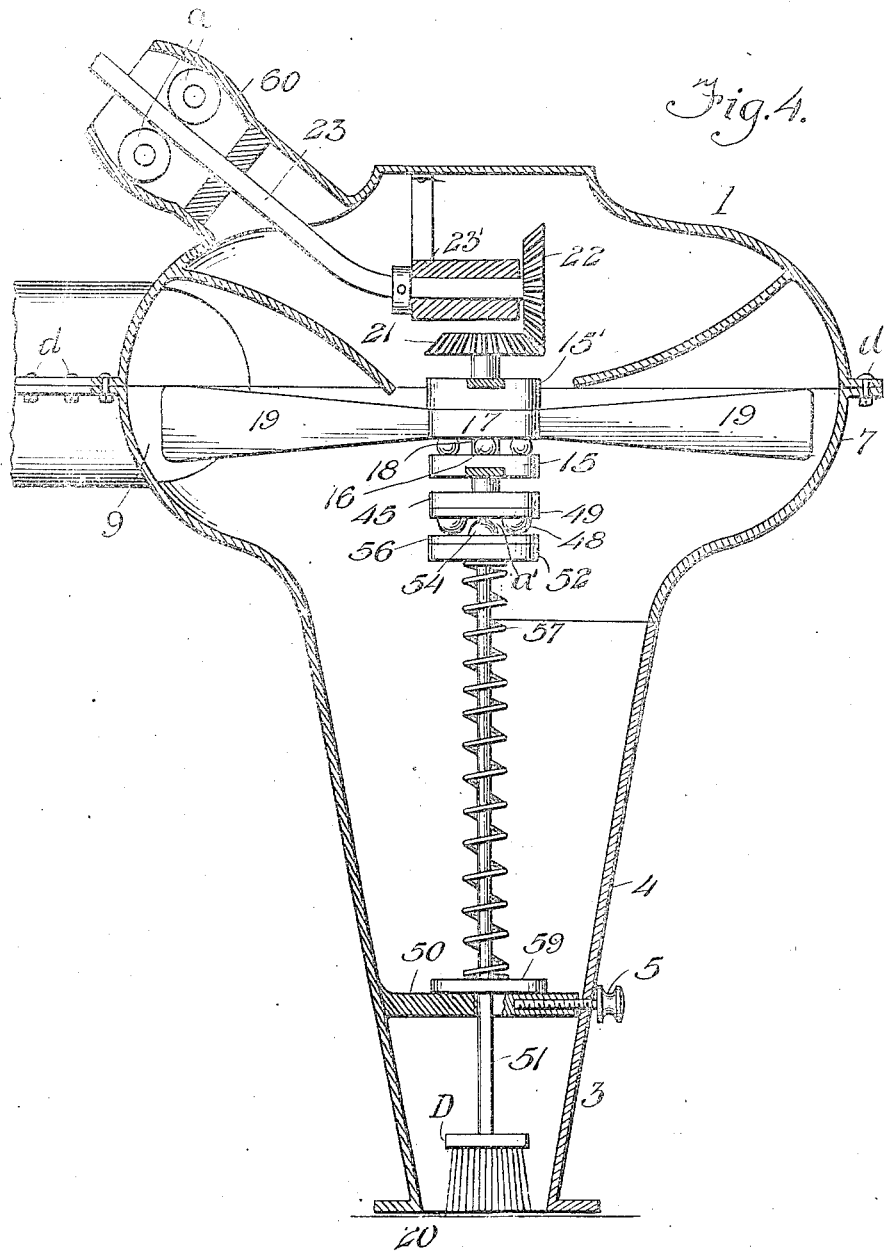

UNITED STATES PATENT OFFICE.

DAVID P. MOORE, OF WASHINGTON, DISTRICT OF COLUMBIA, ASSIGNOR OF ONE-HALF TO SAMUEL B. PACK, OF WASHINGTON, DISTRICT OF COLUMBIA.

PORTABLE HAND-OPERATED SUCTION-CLEANER.

963,008.

Specification of Letters Patent. Patented June 28, 1910.

Application filed October 11, 1909. Serial No. 522,210.

*To all whom it may concern:*

Be it known that I, DAVID P. MOORE, a citizen of the United States, residing at Washington, in the District of Columbia, have invented certain new and useful Improvements in Portable Hand-Operated Suction-Cleaners, of which the following is a specification, reference being had therein to the accompanying drawing.

My present invention relates to improvements in portable hand-operated suction cleaners, the main object being the provision of a cleaner, which is provided with a suction head, having a detachable vibrating brush, a suction fan and means for operating the fan and brush, said means being readily accessible to the operator as a handle is attached to the suction head, and the operating means is attached to said handle, whereby with one hand the operator may pull or push the suction head over the surface to be cleaned, while operating the fan and brush with the other hand.

To clearly illustrate my invention, attention is invited to the accompanying drawings, in which:—

Figure 5:
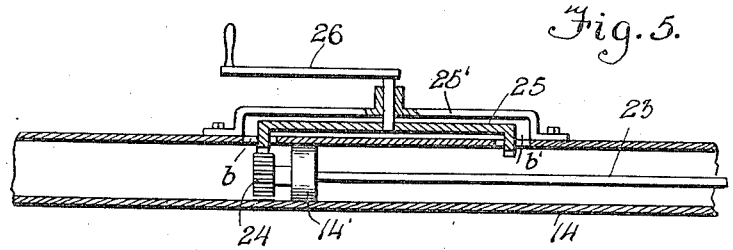
Figure 7:
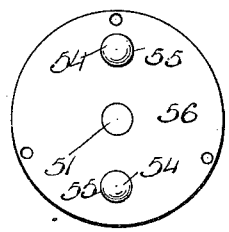
Figure 8:
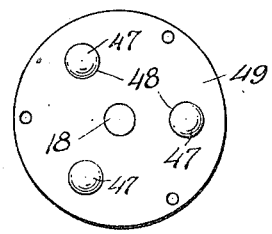
Figure 6:
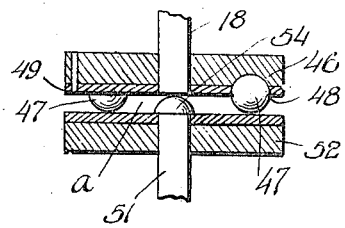

Figure 1 is a front elevation of the cleaner, the handle being shortened by breaking it away intermediate of its ends. Fig. 2 is a side elevation thereof. Fig. 3 is a section through the suction head on line *x—x* Fig. 2 looking in the direction of the arrow, the suction head being made substantially full sized. Fig. 4 is a similar view taken on line *y—y*, Fig. 1, looking in the direction of the arrow. Fig. 5 is a section on line *z—z* Fig. 2. Fig. 6 is an enlarged section through the device for imparting a vibrating motion to the rod and its brush. Fig. 7 is a top plan view of the disk carried upon the upper end of the brush's rod, and Fig. 8 is a bottom plan view of the disk carried by the lower end of the rotatable shaft.

Referring to the drawings:—the numeral 1 designates the complete suction head or casing, having the enlarged fan carrying portion 7, and the reduced suction end 3, whose front wall 4, is removably held in place by means of the thumb screw 5, which passes through the wall 4 and enters the threaded socket of one of the lugs 50. Mounted within the mouth of the suction head are the two casters or wheels 6, which permit the device to be easily pushed or pulled over the surface to be cleaned. The fan carrying portion 7, is provided with the removable dome 8, which is secured thereto by means of the bolts *d*, thus permitting ready access to the interior of the suction head from above. The casing is provided with an outlet spout 9, which has removably attached thereto the air filtering and dust and dirt collecting fabric bag or receptacle A, whose other end is closed and detachably connected to the tubular handle 14, by means of the clip 11, and the hook 13. By this means, when the bag or receptacle is filled with dust and dirt, the clip 11 is removed from the hook 13 and the clip removed from the mouth 12, of the bag, thus permitting the mouth to open and allow the operator to cause the dust and dirt to fall out through said mouth 12.

In the lower part of the enlarged portion 7, of the suction head or casing, I mount two brackets 15 and 15', each one of which is provided with alined openings for the rotatable reception of the shaft 18, which has keyed thereon the disk 17, carrying the fan blades 19, and to reduce the friction between the disk 17 and the bracket 15, I employ the ball thrust bearing 16, as clearly shown in Figs. 3 and 4. It will be seen that it is only necessary to rotate the shaft 18 to cause the fan blades 19 to rotate and create a suction within the suction head so that air and dust and dirt are drawn into the casing at its lower mouth 20, and forced out through the outlet 9, into the air filtering and dust and dirt collecting bag A.

To rotate the fan, I mount upon the upper end of the shaft 18, the bevel gear 21, which meshes at all times with the bevel gear 22, which is mounted upon the lower end of the flexible shaft 23, which shaft is preferably a wire formed shaft, such as is used in dental engines. The lower end of the shaft 23 is guided in the small sleeve 23', carried in the dome of the fan chamber, while the remainder of the said shaft 23, is incased in the hollow handle 14 and the hollow boss or knobbed projection 60, between the guide pulleys *a*, carried in the projection 60. To assemble the shaft 23, the grip 64 is removed, and as the shaft carries only the gear 24, the lower free end thereof, is passed through the hollow handle 14, the block 14', and the boss 60, between the pulleys *a*. The free end of the shaft 23 is then passed through and supported in the sleeve 23', which is of such a length as to insure, when the shaft 23 is properly tightened, the proper meshing at all times of the gears 22 and 21. When properly assembled, the small gear 24 is meshing with the operating gear 25, while the gear 22 is meshing with the gear 21, thus insuring the rotation of the shaft 23 when the gear 25 is operated, this rotation of the shaft 23 insuring the rotation of the shaft 18 through the gears 21 and 22.

Detachably connected to the projection 60, so as to have a radial adjustment with relation to the suction head, by means of the split globular head 61, which encircles the projection 60, and is clamped at any desired angle by means of the clamping band 62, is the tubular handle 14, into which the shaft 23 passes and is journaled in the block 14'.

Upon the upper end of the shaft 23, is keyed the small gear 24, which meshes with the teeth of the large gear 25, carried by the support 25', said gear 25 having a crank 26, by means of which the gear 25 is revolved, thus rotating the shaft 18 and fan blades 19, through the shaft 23 and its gearing. The toothed portion of the gear 25 projects through the two slots $b$ and $b'$, cut in the handle 14. By this means, it will be seen that it is only necessary to push or pull the suction head or casing over the surface to be cleaned, simultaneously operating the gear 25 through its crank 26.

Secured upon the extreme lower end of the fan shaft 18, is a disk 45, which is provided with a series of three recesses 46, for the rotatable reception of the steel balls 47, which project through the apertures 48, of the retaining disk 49, which is detachably secured to the disk 45, this member forming the upper and rotating member of my vibrator, and as shown in Fig. 8 is provided with three balls 47.

Removably mounted in the space between the two lugs 50, of the suction head, is a rod 51, which is only adapted to have a vertical reciprocating movement, and upon the lower end of this rod is carried the brush D, whose extreme lower end when one of the balls 47 contacts one of the balls 55, will be projected below the extreme lower end of the suction head or be forced into contact with the surface to be cleaned to beat said surface and disturb or loosen the dust or dirt therein or thereon. The mechanism to project and return the brush, consists of the disk 45 and its balls 47, and the disk 52 and its balls 55, said balls 55, being rotatably mounted in the recesses 53 of the disk 52, and projecting exteriorly of the apertures 54 of the retaining disk 56, this disk and its parts being secured to the upper end of the vibratory rod 51. These balls 55 are preferably of an even number, in this case being two, so that as the disk 45 is rotated the three balls contact the two balls, so that six vibrations are given to the brush, each rotation of the disk 45. In order to return the disk and rod 51, so that the balls may contact the spaces $a'$ upon the disks 49 and 56 between the balls, or cause the brush to assume the position shown in Figs. 3 and 4, I employ the coiled spring 57, which surrounds the rod 51 and abuts the underside of the disk 52, and exerts a tension against the disk 59, which in turn rests upon the upper side of the lugs 50. By this means the brush D, may be used as a disturber of the dust or dirt in the surface to be cleaned, but should it not be used, the thumb-screw 5, is released, permitting the wall 4, to be removed, so that the rod 51 and its spring, brush and the lower member of the vibrator may be bodily removed, thus permitting the suction head to be used conveniently as a portière cleaner.

To properly operate or manipulate my suction cleaner, the extreme upper end of the tubular handle 14, is provided with the D-shaped hand-grip 64, said hand-grip being placed at any desired angle that will insure the easy manipulation of the cleaner.

What I claim, as new, is:—

1. In a device of this character, the combination of a casing having a suction end and a mechanism holding and fan chamber, a shaft journaled in the casing, a fan carried thereby, a rod slidably mounted in the casing below and in line with the shaft, a brush carried upon the lower end of said rod, a spring mounted upon the rod for holding the lower end of the brush within the mouth of the suction end, co-acting means carried by the lower end of the shaft and the upper end of the rod for causing the rotary motion of the shaft to intermittently project the rod against the tension of the spring, thereby giving a reciprocating motion to the brush, and mechanism for rotating said shaft.

2. In a device of this character, the combination of a casing having a suction mouth and a mechanism holding and fan chamber, a shaft journaled in the casing, a fan carried thereby, a rod capable of a longitudinally reciprocating movement mounted in the casing below the shaft, a brush carried upon the lower end of said rod, co-acting means carried by the lower end of the shaft and the upper end of the rod for causing the rotary motion of the shaft to impart a reciprocating motion to the rod and brush, and mechanism for rotating said shaft.

3. In a device of this character, the combination of a casing having an elongated suction end and a mechanism holding and fan chamber, a shaft journaled in the casing, a fan carried thereby, a rod slidably mounted in the casing below and in line with the shaft, a brush carried upon the lower end of said rod, a spring mounted upon the rod for holding the lower end of the brush within the mouth of the suction end, a disk carried upon the lower end of the shaft, a disk upon the upper end of the rod, one of said disks being provided with an even number, and the other with an odd number of balls projecting into the same path, whereby as the shaft rotates, the balls intermittently engage each other to rapidly project the rod against the tension of the spring, thereby giving a reciprocating motion to the brush, and mechanism for rotating said shaft.

In testimony whereof I affix my signature in presence of two witnesses.

DAVID P. MOORE.

Witnesses:
MARY E. MOORE,
A. M. PARKINS.